Patented Mar. 11, 1924.

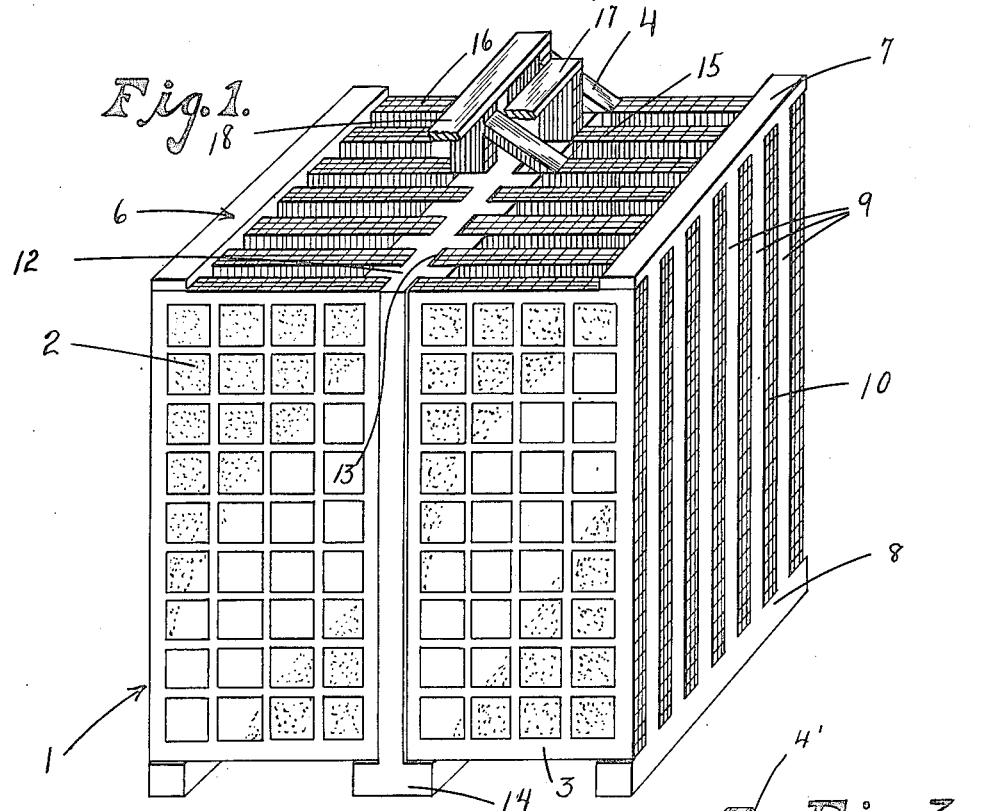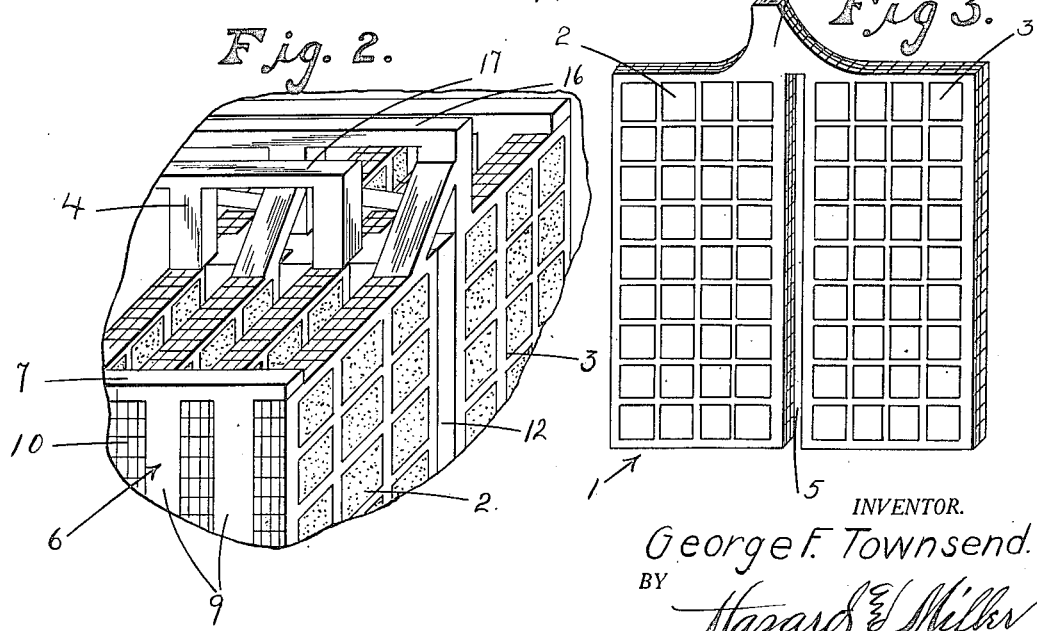

1,486,398

UNITED STATES PATENT OFFICE.

GEORGE F. TOWNSEND, OF OAKLAND, CALIFORNIA, ASSIGNOR, BY DIRECT AND MESNE ASSIGNMENTS, TO T. & T. STORAGE BATTERY CO., INC., OF LOS ANGELES, CALIFORNIA, A CORPORATION OF CALIFORNIA.

STORAGE BATTERY.

Application filed October 6, 1921. Serial No. 505,699.

*To all whom it may concern:*

Be it known that I, GEORGE F. TOWNSEND, a citizen of the United States, residing at Oakland, in the county of Alameda and State of California, have invented new and useful Improvements in Storage Batteries, of which the following is a specification.

This invention relates to storage batteries, and has for its objects to generally improve the construction of batteries so that separators between the positive and negative plates can be of minimum size or area, which condition would cut down the internal resistance of the battery, and thereby improve the efficiency of the same; to provide a comparatively narrow plate so that the distribution of the current will be uniform over the entire surface of the same, which will cause uniform expansion and contraction of the plate so that all tendency for them to buckle will be practically negligible; and by such an arrangement as I employ, the temperature within the battery is kept down, due to the free movement of acid around the plates.

With the foregoing and other objects in view, my invention consists in certain novel features of construction and arrangement of parts that will be hereinafter more fully described and claimed and illustrated in the accompanying drawings, in which:

Fig. 1 is a perspective of the improved storage battery plates mounted within the spacing members.

Fig. 2 is a fragmentary perspective of the battery, the casing of which is broken away to show my improved plate construction mounted therein.

Fig. 3 is a perspective of a plate showing a modified form of connecting means.

The principal object of this invention is to provide a plate of suitable construction so that the current will be uniformly distributed over the entire surface so as to prevent increased localized temperature and thereby eliminate all tendency for the plate to buckle, and to accomplish this purpose the plate 1 is made of comparatively narrow strips 2 and 3 connected at their upper ends by suitable connecting means 4, and the arrangement as thus set forth forms a vertical slot 5 between the plates.

The plate is suitably held within the battery casing, as by end spacers 6, preferably made of hard rubber, and which comprises horizontal upper and lower members 7 and 8, connected by a plurality of vertical members 9 suitably spaced from each other so as to form a slot 10 which will receive the end of one of the plates, and an intermediate spacing member 12 is formed by having vertical grooves 13 terminating at the base 14 which will limit the downward movement of the plates.

It is thus seen that the plates can be supported within the intermediate spacing member as by having the ends of the plates adjacent to slot 5 pass down into the grooves 13, and the outer ends of the plates will be held in suitable space relation as by the outer spacing member 6.

In order to suitably connect the positive and negative plates, the connecting lug 4 terminates to one side of the center of the slot 5, and it is thus seen that if the positive plate 16 were placed with the lug 4 on one side of the intermediate spacing member 13, the negative plate 15 could be placed with the connecting lug 4 on the opposite side, so that the connecting lugs of the adjacent plates would be in staggered relation to each other, and a suitable bar 17 could connect all the lugs of the negative plate as by welding or any other suitable means.

It is seen that the lugs 4 terminate in an upwardly extending portion which is adapted to receive members 17 and 18, and it is the termination of this upwardly extending portion that is positioned to one side of the slot. And a second bar 18 could connect the lugs of the positive plates 16.

It is thus seen that by my construction, the plates 2 and 3 which go to make one single positive or negative plate could be made comparatively narrow so as to cause the current to be spread more evenly over the surface of each individual section, and when the plate is taken as a whole, it would be seen that a very uniform distribution would be obtained, and that increased localized temperature would be practically eliminated which would reduce any tendency for the plates to buckle.

While I have only shown two sections comprising one plate, it is obvious that any number of sections could be made by using a corresponding increased number of intermediate spacing members, and I therefore do not limit myself to two sections.

It will be obvious that any suitable means could be employed for connecting the sections of the plate together, and the showing in Fig. 3 of the lug 4' is simply one of several other means that could be employed.

I claim as my invention:

1. A storage battery comprising a plurality of plates, each of said plates formed of a plurality of sections, by having longitudinal slots therein, and means for spacing the outer ends of said sections, and intermediate spacing means received in said slots.

2. A storage battery having a plurality of plates formed of sections by having slots therein, a spacing member for the outer ends of said plates formed of strips of non-conducting material vertically disposed and spaced to form vertical slots to receive said plates, and an intermediate spacing member received in said slot, said member having vertical grooves to receive the inner ends of said sections.

3. A storage battery comprising positive and negative plates having alined vertically extending slots formed medially of their ends, end spacing members supporting and interposed between the several plates, and an intermediate spacing member fitted within said slots and cooperating with the first members for maintaining the plates in spaced relation to each other.

4. A storage battery comprising end spacing members including horizontal portions and spaced vertical portions connecting the horizontal portions at intervals, an intermediate spacing member including a vertical portion, relatively short portions extending laterally from the vertical portion at regular spaced intervals, and positive and negative plates having slots formed therein adapted to receive the intermediate spacing member with the laterally extending portions interposed between adjacent plates and the outer ends of the plates disposed between the vertical portions of the end spacing members.

5. A spacer for the plates of storage batteries comprising a plate having vertical slots formed therein closed at their upper and lower ends and of an area to receive the ends of battery plates.

6. A spacer for the plates of storage batteries comprising slotted end plates, and an intermediate plate having grooves corresponding in number and position to the slots of the end plates.

7. A storage battery comprising slotted active plates, means for spacing the ends of the plates, and means received in the slots of the plates for spacing the intermediate portions of the plates.

8. A storage battery comprising active plates formed of sections and arranged in edge to edge relation, means for spacing the outer ends of the plates, and means received between the sections for spacing the sections of the plates from each other.

In testimony whereof I have signed my name to this specification.

GEORGE F. TOWNSEND.